US009886209B2

(12) United States Patent
Alshinnawi et al.

(10) Patent No.: US 9,886,209 B2
(45) Date of Patent: Feb. 6, 2018

(54) CONTROLLING FILE PLACEMENT ON A DISK DRIVE TO IMPROVE FILE ACCESS

(71) Applicant: Lenovo Enterprise Solutions (Singapore) Pte. Ltd., Singapore (SG)

(72) Inventors: Shareef F. Alshinnawi, Apex, NC (US); Gary D. Cudak, Wake Forest, NC (US); J. Mark Weber, Wake Forest, NC (US); Joseph F. Herman, Raleigh, NC (US)

(73) Assignee: Lenovo Enterprise Solutions (Singapore) Pte. Ltd. (SG)

( * ) Notice: Subject to any disclaimer, the term of this patent is extended or adjusted under 35 U.S.C. 154(b) by 0 days.

(21) Appl. No.: 15/044,263

(22) Filed: Feb. 16, 2016

(65) Prior Publication Data
US 2017/0235514 A1    Aug. 17, 2017

(51) Int. Cl.
*G06F 12/00*    (2006.01)
*G06F 13/00*    (2006.01)
(Continued)

(52) U.S. Cl.
CPC .......... *G06F 3/0647* (2013.01); *G06F 3/0613* (2013.01); *G06F 3/0631* (2013.01); *G06F 3/0643* (2013.01); *G06F 3/0676* (2013.01)

(58) Field of Classification Search
CPC ........ G06F 3/06; G06F 3/0601; G06F 3/0602; G06F 3/0604; G06F 3/0605; G06F 3/0607; G06F 3/061; G06F 3/0611; G06F 3/0613; G06F 3/0628; G06F 3/0629; G06F 3/0631; G06F 3/0638; G06F 3/0643; G06F 3/0644; G06F 3/0646; G06F 3/0647; G06F 3/064;
(Continued)

(56) References Cited

U.S. PATENT DOCUMENTS 5,345,575 A * 9/1994 English ................. G06F 3/0601
360/78.04
5,463,772 A * 10/1995 Thompson ............ G06F 3/0601
707/693
(Continued)

OTHER PUBLICATIONS

SpeedUp Your PC. Freeware Defragment, Optimize Files on Your HDD; Tarandeep Singh; Sep. 21, 2009; retrieved from http://geeknizer.com/speedup-your-pc-freeware-defragment-optimize-files-on-your-hdd/ on May 5, 2017 (4 pages).*
(Continued)

*Primary Examiner* — Daniel C Chappell
(74) *Attorney, Agent, or Firm* — Jeffrey L. Streets (57) ABSTRACT

A method includes tracking access to files that are stored on a single disk, and identifying a file access sequence involving a first file and a second file stored on the disk, wherein the first file is accessed before the second file. The method further includes determining a time differential between a time that the first file is accessed and a time that the second file is accessed, and determining a direction and speed at which a drive head of the disk can move between sectors and tracks of the disk. Still further, the method includes migrating one or both of the first and second files to a new location on the disk so that, after the drive head of the disk has read the first file, the drive head is repositioned at a beginning of the second file in a period of time that is a function of the time differential.

14 Claims, 4 Drawing Sheets

(51) Int. Cl.
*G06F 13/28* (2006.01)
*G06F 3/06* (2006.01)

(58) Field of Classification Search
CPC .... G06F 3/0649; G06F 3/0655; G06F 3/0668;
G06F 3/0671; G06F 3/0673; G06F
3/0674; G06F 3/0676; G06F 12/00; G06F
12/02; G06F 12/0207; G06F 12/0215;
G06F 12/0223; G06F 12/023; G06F
12/0238; G06F 12/0246; G06F
2003/0691–2003/0698; G11B 5/00; G11B
5/012; G11B 5/02; G11B 25/00; G11B
25/04; G11B 25/043; G11B
2005/0002–2005/0037
See application file for complete search history.

(56) References Cited

U.S. PATENT DOCUMENTS

| | | | | | |
|---|---|---|---|---|---|
| 5,682,273 | A | * | 10/1997 | Hetzler | G06F 1/3221 360/69 |
| 5,887,128 | A | * | 3/1999 | Iwasa | G06F 3/0601 714/6.1 |
| 6,195,217 | B1 | * | 2/2001 | Park | G11B 27/105 360/48 |
| 6,530,000 | B1 | * | 3/2003 | Krantz | G06F 3/0613 710/40 |
| 6,658,535 | B1 | * | 12/2003 | Megiddo | G06F 3/0613 711/112 |
| 7,293,133 | B1 | * | 11/2007 | Colgrove | G06F 3/0608 711/111 |
| 7,870,128 | B2 | * | 1/2011 | Jensen | G06F 3/0613 707/727 |
| 8,078,773 | B2 | * | 12/2011 | Flake | G06F 3/0619 709/248 |
| 8,949,483 | B1 | * | 2/2015 | Martin | G06F 3/0653 710/15 |
| 9,619,170 | B2 | * | 4/2017 | Hashimoto | G11C 16/3495 |
| 9,734,911 | B2 | * | 8/2017 | Sinclair | G11C 16/10 |
| 2003/0149834 | A1 | * | 8/2003 | Susnjar | G11B 5/4886 711/112 |
| 2005/0111140 | A1 | * | 5/2005 | Lee | G11B 5/5526 360/264.7 |
| 2005/0172067 | A1 | * | 8/2005 | Sinclair | G06F 3/0613 711/103 |
| 2007/0220201 | A1 | * | 9/2007 | Gill | G06F 12/123 711/113 |
| 2008/0005475 | A1 | * | 1/2008 | Lubbers | G06F 3/0613 711/118 |
| 2009/0106506 | A1 | * | 4/2009 | Skerlj | G06F 12/02 711/154 |
| 2009/0310242 | A1 | * | 12/2009 | McLeod | G06F 3/0623 360/55 |
| 2011/0320709 | A1 | * | 12/2011 | Han | G06F 3/061 711/114 |
| 2013/0151805 | A1 | * | 6/2013 | Fontignie | G06F 3/0611 711/170 |
| 2015/0058557 | A1 | * | 2/2015 | Madhusudana | G06F 3/0655 711/114 |
| 2015/0134905 | A1 | * | 5/2015 | Oe | G06F 3/0608 711/114 |
| 2015/0179198 | A1 | * | 6/2015 | Ong | G11B 5/596 360/31 |
| 2015/0286438 | A1 | * | 10/2015 | Simionescu | G06F 12/0866 711/103 |
| 2016/0110219 | A1 | * | 4/2016 | Enault | G06F 17/30194 710/40 |

OTHER PUBLICATIONS

Samsung, "Samsung Solid State Drive—RAPID mode" white paper, Jul. 18, 2013, 8 pages.*
Disk subsystem load balancing: disk striping vs. conventional data placement; Ganger et al; Proceeding of the Twenty-Sixth Hawaii International Conference on System Sciences; Jan. 8, 1993; pp. 40-49 (10 pages).*
Concurrent file reorganization for record clustering: a performance study; Omiecinski et al; Eighth International Conference on Data Engineering; Feb. 2-3, 1992; pp. 265-272 (8 pages).*
SAIL: self-adaptive file reallocation on hybrid disk arrays; Xie et al; Proceedings of the 15th international conference on High performance computing; Dec. 17-20, 2008; pp. 529-540 (12 pages).*
Energy-efficient file placement techniques for heterogeneous mobile storage systems; Kim et al; Proceedings of the 6th ACM & IEEE International conference on Embedded software; Dec. 22-25, 2006; pp. 171-177 (7 pages).*
Fitzpatrick, Jason "Five Best Disk Defragmenters" Lifehacker, http://lifehacker.com/5348638/five-best-disk-defragmenters; filed to: HIVE FIVE, Aug. 30, 2009, 24 pages.
IObit, "IObit Malware Fighter 4 Beta", http://www.iobit.com/en/recommend/imf.php?name=smart_defrag, Free Download V4.0.0/35.8MB, Nov. 9, 2015, 2 pages.

* cited by examiner

CONTROLLING FILE PLACEMENT ON A DISK DRIVE TO IMPROVE FILE ACCESS

BACKGROUND

Field of the Invention

The present invention relates to data storage on a disk drive and how to organize files on the disk drive.

Background of the Related Art

A hard disk drive is a data storage device including one or more rotating disks coated with magnetic material. An actuator arm is controllable moved to position a read/write head in alignment with a desired track as the disk rotates under the read/write head. The amount of time required to access data on the hard disk drive ("access time") is affected by the amount of time required to move the read/write head to the desired track ("seek time"), the amount of time required for the desired disk sector to rotate under the already positioned read/write head ("rotational latency"), and the rate at which data can be transferred from the disk and a disk buffer to an attached computer ("data transfer rate"). The seek time is generally determined by the design of a voice coil designed to rotate an arm that supports the read/write head just above the surface of the disk. The rotational latency is generally determined by the rotational speed of the disk, which is often express in rotations-per-minute (RPM), such that a higher rotational speed results in a lower rotational latency.

Disk fragmentation can occur when the free space on a disk prevents a file from being written in a contiguous area of the disk. Accordingly, smaller portions (fragments) of the file are stored in separate areas. Therefore, accessing a file with two fragments requires repositioning of the read/write head two times, once for each fragment. The increase in movement of the read/write head can have a large impact on system performance. Over a long period of use, disk fragmentation tends to get worse and system performance will continue to suffer.

Fortunately, it is possible to reduce the amount of fragmentation on a disk using a process called defragmentation. Defragmentation programs generally attempt to organize files into fewer fragments and create large unused areas that can be used for contiguous storage of new files. While a defragmentation program or process may be manually initiated by a user, such a process may also be scheduled for off-peak hours to keep disk fragmentation from significantly reducing system performance.

BRIEF SUMMARY

One embodiment of the present invention provides a method comprising tracking access to files that are stored on a single disk, and identifying a file access sequence involving a first file and a second file stored on the disk, wherein the first file is accessed before the second file. The method further comprises determining a time differential between a time that the first file is accessed and a time that the second file is accessed, and determining a direction and speed at which a drive head of the disk can move between sectors and tracks of the disk. Still further, the method comprises migrating one or both of the first and second files to a new location on the disk so that, after the drive head of the disk has read the first file, the drive head is repositioned at a beginning of the second file in a period of time that is a function of the time differential.

Another embodiment of the present invention provides a computer program product comprising a computer readable storage medium having program instructions embodied therewith, wherein the program instructions are executable by a processor to cause the processor to perform a method. The method comprising tracking access to files that are stored on a single disk, and identifying a file access sequence involving a first file and a second file stored on the disk, wherein the first file is accessed before the second file. The method further comprises determining a time differential between a time that the first file is accessed and a time that the second file is accessed, and determining a direction and speed at which a drive head of the disk can move between sectors and tracks of the disk. Still further, the method comprises migrating one or both of the first and second files to a new location on the disk so that, after the drive head of the disk has read the first file, the drive head is repositioned at a beginning of the second file in a period of time that is a function of the time differential.

A further embodiment of the present invention provides a method comprising obtaining a usage history for a disk drive, wherein the usage history is attributable to a certain user. The method further comprises allocating regions on the disk drive based on usage ratios of file types determined from the usage history, and storing files of a given file type in a region of the disk that has been allocated for storage of files of the given file type.

Yet another embodiment of the present invention provides a computer program product comprising a computer readable storage medium having program instructions embodied therewith, wherein the program instructions are executable by a processor to cause the processor to perform a method. The method comprises obtaining a usage history for a disk drive, wherein the usage history is attributable to a certain user. The method further comprises allocating regions on the disk drive based on usage ratios of file types determined from the usage history, and storing files of a given file type in a region of the disk that has been allocated for storage of files of the given file type.

DETAILED DESCRIPTION

One embodiment of the present invention provides a method comprising tracking access to files that are stored on a single disk, and identifying a file access sequence involving a first file and a second file stored on the disk, wherein the first file is accessed before the second file. The method further comprises determining a time differential between a time that the first file is accessed and a time that the second file is accessed, and determining a direction and speed at which a drive head of the disk can move between sectors and tracks of the disk. Still further, the method comprises migrating one or both of the first and second files to a new location on the disk so that, after the drive head of the disk has read the first file, the drive head is repositioned at a beginning of the second file in a period of time that is a function of the time differential.

Access to files stored on the disk may be tracked by various entities of the computing device, such as the operating system, a driver for the hard disk drive, or a controller for the hard disk drive. Tracking access to files that are stored on a single disk may include preparing a log (history) including a plurality of file access entries, wherein each file access entry identifies a file name and a time that the named file was accessed. Due to the high rotational speeds of modern hard disk drives, the time may be identified down to the millisecond or smaller time increments. Optionally, the log may be unique to a user and may be shared among various devices used by the user, such that the relative file locations may be similarly implemented on multiple devices. It should also be recognized that the hard disk drive may further store an address for each file stored on the disk. For example, the hard disk drive may store a map or list of files identifying their logical block address and associated physical location on the disk.

By tracking the access to files stored on the disk, a file access sequence involving a first file and a second file stored on the disk may be identified. For example, identifying a file access sequence may include determining whether the first file and the second file are accessed in the same sequence in greater than a predetermined percentage of accesses to either the first or second file. In other words, file accesses are analyzed to identify a correlation between access to the first file and access to the second file. Typically, if such a correlation exists, it may be expected to occur within a sliding window of time, such as less than 10-100 milliseconds for a disk drive that spins at 10,000 RPM. This might be a case where a first file (File1) is an Excel.exe file, a second file (FileA) is an Excel.dll file, and a third file (FileZ) is a Parts.xls file.

When a file access sequence has been identified, such as wherein the first file is accessed before the second file, the method may further determine a time differential between a time that the first file is accessed and a time that the second file is accessed. In one option, the time differential may be an average time differential over a plurality of instances of the file access sequence. In another option, the time differential may be the greatest time differential among a plurality of instances of the file access sequence. Other statistical measures of time differential may be similarly used.

The methods further rely upon determining a direction and speed at which a drive head of the disk can move between sectors and tracks of the disk. Such a determination may be as simple as reading a register or vital product data that provides performance data for the hard disk drive, or as complex as detecting the direction and measuring both the drive head seek time and rotational speed. In some disk drive implementations, the rotational direction, rotational speed and seek speed will be constant. In one example, an amount of time necessary to move the drive head between any two relative locations on the disk may be measured and mapped for reference. Such a map may identify drive head speed between sectors or tracks on the disk. Optionally, the disk head speed may be mapped by disk firmware or drivers. In one embodiment, the operating system obtains disk head speed data from the disk drive and determines the new location for one or both of the first and second files.

One or both of the first and second files may be migrated to a new location on the disk during a period that the disk is not otherwise being used. Accordingly, the optimization of file locations may be performed in off-peak periods of low or no disk drive usage. Depending upon the nature of the computer system in which the disk drive operates, the migration may be scheduled for nighttime hours or whenever there is a historically low usage of the disk drive. Optionally, files stored on the disk drive may be periodically defragmented, wherein one or both of the first and second files are migrated during the defragmenting of the files stored on the disk. In a further option, the method may elect to migrate only the smallest file among the first and second files, which will serve to reduce the amount of data that needs to be relocated. Alternatively, the method may elect to migrate either the first or the second file according to whether there is disk space available in the desired relative location on the disk.

As stated above, the method comprises migrating one or both of the first and second files to a new location on the disk so that, after the drive head of the disk has read the first file, the drive head is repositioned at a beginning of the second file in a period of time that is a function of the time differential. However, there are circumstances that may lead to the second file being in a location such that the drive head may not be repositioned precisely at the instant that the system requests access to the second file. For example, increases or decreases to the length of the first file may affect the amount of time available between completing access to the first file and beginning to access the second file. Also, a higher or lower workload on a processor of the computing system may affect loading of the first file, such that a request for access to the second file may be delayed or occur earlier. This variation means that if the relative locations of the first and second files were such that the drive head could only be repositioned to the beginning of the second file under ideal conditions, then, under frequent nonideal conditions, the second file could not be accessed until the drive disk had completed another full rotation. Accordingly, various embodiments of the present invention seek a relative location of the first and second files, such that the period of time available to reposition the drive head (i.e., the time period after completing access to the first file and before beginning access to the second file) is equal to the time differential plus some measure of the variation or a margin of error. For example, the time period may be equal to the time differential plus no more than 25 percent of the time differential. In other words, the period of time available to reposition the drive head is equal to the time differential plus some safety margin of between 1 and 25% of the time differential. Such a safety margin is expected to substantially reduce the likelihood of missing the file and having to wait for the disk to complete another full rotation. Still, by using a small safety margin, the benefits of managing the relative locations of the file are still largely preserved. In one alternative, the period of time available for repositioning the drive head is equal to the time differential plus no more than 25 percent of a time required for one rotation of the disk. Other and further safety margins may be implemented consistent with the present invention.

Another embodiment of the present invention provides a computer program product comprising a computer readable storage medium having program instructions embodied therewith, wherein the program instructions are executable by a processor to cause the processor to perform a method. The method comprises tracking access to files that are stored on a single disk, and identifying a file access sequence involving a first file and a second file stored on the disk, wherein the first file is accessed before the second file. The method further comprises determining a time differential between a time that the first file is accessed and a time that the second file is accessed, and determining a direction and speed at which a drive head of the disk can move between sectors and tracks of the disk. Still further, the method comprises migrating one or both of the first and second files to a new location on the disk so that, after the drive head of the disk has read the first file, the drive head is repositioned at a beginning of the second file in a period of time that is a function of the time differential. The foregoing computer program product may further include program instructions for implementing or initiating any one or more aspects of the methods described herein. Accordingly, a separate description of the methods will not be duplicated in the context of a computer program product.

A further embodiment of the present invention provides a method comprising obtaining a usage history for a disk drive, wherein the usage history is attributable to a certain user. The method further comprises allocating regions on the disk drive based on usage ratios of file types determined from the usage history, and storing files of a given file type in a region of the disk that has been allocated for storage of files of the given file type. The file types may include, without limitation, one or more file type selected from operating system, games, music, shared storage and applications.

The step of obtaining a disk usage history may include determining an amount of disk space on the disk drive that is used for each of a plurality of file types. Alternatively, obtaining the usage history for a disk drive may include identifying an access rate and average file size for each of a plurality of file types. In one option, the disk drive is associated with a first computing device and the usage history for the disk drive is attributable to a given user.

The step of allocating regions on a disk based on usage ratios of file types determined from the disk usage history may include determining a size and location of each allocated region. A user option or preference may be implemented to prevent the allocation to one or more file type from exceeding a predetermined amount of data storage. In another option, the method may store a region allocation map in the disk drive controller or disk drive driver and cause files to be stored in accordance with the region allocation map.

The regions may be allocated using a variety of criteria. In one example, the method includes analyzing the disk usage history to determine which file type is accessed most frequently, and then allocating the most accessible regions on the disk to the file type that has been determined to be accessed most frequently. In another example, the method includes determining how much of the disk is being used to store files in each of a plurality of file types, and then allocating the regions on the disk to one of the file types according to the amount of the disk being used to store files of that file type. In a further example, the method includes analyzing the disk usage history to determine, for each file type, a frequency at which files of the file type are added, removed or modified, and then allocating the most accessible regions on the disk to the file type that has been determined to be most frequently added, removed or modified. In a still further example, the method includes analyzing the disk usage history to determine which file types experience the largest changes in total disk storage space, and then allocating adjacent regions to file types that experience the largest changes.

In another option, a file that is larger than a buffer of the disk drive may be intentionally segmented within an allocated region so that the drive head can be positioned to read a subsequent segment of the file as soon as the disk buffer has cleared.

In a further option, the method may include periodically defragmenting files stored on the disk, wherein a file being defragmented is migrated to a region allocated to files having the same file type as the file being defragmented. In a still further option, the method may write only new files of the given file type in a region of the disk that has been allocated for storage of files of the given file type.

In one embodiment, the method may allocate regions on a second disk drive based on usage ratios of file types determined from the usage history for the data storage device, wherein the second data storage device is associated with a second computing device, and wherein the first and second computing devices are associated with the same user. Based on the assumption that a user may use files and file types similar among the user's various computing device, the usage history collected on one data storage device associated with the user may be used to affect the allocation of regions on a second data storage device that is also associated with the user. Similarly, the allocations may be applied to new data storage devices or reinstallations of a data storage device.

Yet another embodiment of the present invention provides a computer program product comprising a computer readable storage medium having program instructions embodied therewith, wherein the program instructions are executable by a processor to cause the processor to perform a method. The method comprises obtaining a usage history for a disk drive, wherein the usage history is attributable to a certain user. The method further comprises allocating regions on the disk drive based on usage ratios of file types determined from the usage history, and storing files of a given file type in a region of the disk that has been allocated for storage of files of the given file type. The foregoing computer program product may further include program instructions for implementing or initiating any one or more aspects of the methods described herein. Accordingly, a separate description of the methods will not be duplicated in the context of a computer program product.

Figure 1:
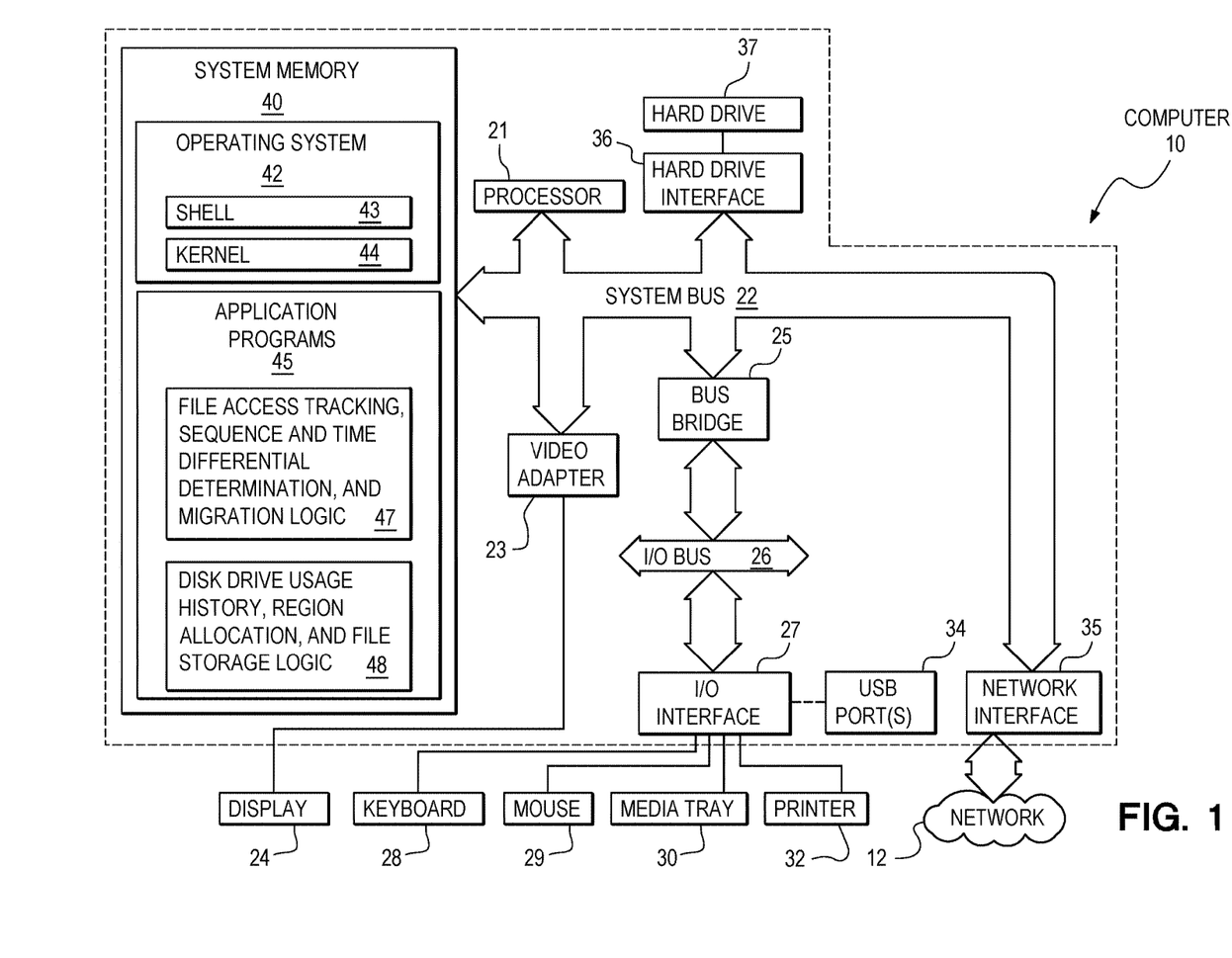
FIG. 1 is a diagram of a computer including a hard disk drive.

FIG. 1 is a diagram of a compute node or server 10 that is capable of implementing methods of the present invention. In this non-limiting example, the compute node 10 includes a processor unit 21 that is coupled to a system bus 22. The processor unit 21 may utilize one or more processors, each of which has one or more processor cores. A video adapter 23, which drives/supports a display 24, is also coupled to the system bus 22. The system bus 22 is coupled via a bus bridge 25 to an input/output (I/O) bus 26. An I/O interface 27 is coupled to the I/O bus 26 and provides communication with various I/O devices, including a keyboard 28, a mouse 29, a media tray 30 (which may include storage devices such as CD-ROM drives, multi-media interfaces, etc.), a printer 32, and USB port(s) 34. As shown, the compute node 10 is able to communicate with other network devices, such as the media/content sources 13, via the network 12 using a network adapter or network interface controller 35.

A hard drive interface 36 is also coupled to the system bus 22 and interfaces with a hard disk drive 37. In a preferred embodiment, the hard disk drive 37 communicates with system memory 40, which is also coupled to the system bus 22. System memory includes the lowest level of volatile memory in the compute node 20. This volatile memory may include additional higher levels of volatile memory (not shown), including, but not limited to, cache memory, registers and buffers. Data that populates the system memory 40 may include an operating system (OS) 42 and application programs 45.

The operating system 42 includes a shell 43 for providing transparent user access to resources such as application programs 45. Generally, the shell 43 is a program that provides an interpreter and an interface between the user and the operating system. More specifically, the shell 43 executes commands that are entered into a command line user interface or from a file. Thus, the shell 43, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 44) for processing. Note that while the shell 43 is a text-based, line-oriented user interface, the present invention will equally well support other user interface modes, such as graphical, voice, gestural, etc.

As depicted, the operating system 42 also includes the kernel 44, which includes lower levels of functionality for the operating system 42, including providing essential services required by other parts of the operating system 42 and application programs 45, including memory management, process and task management, disk management, and mouse and keyboard management. The application programs 45 in the system memory of the compute node 20 may include, without limitation, file access tracking, file sequence and time differential determination, and file migration logic 47, according to one embodiment such as that shown in FIG. 5. Alternatively, the application programs 45 may include, without limitation, disk drive usage history, region allocation, and file storage logic 48, according to another embodiment such as that shown in FIG. 7. Optionally, all or part of these applications may be included as part of the operating system 42 or hard disk drive interface 36.

The hardware elements depicted in the compute node 10 are not intended to be exhaustive, but rather are representative. For instance, the compute node 10 may include alternate memory storage devices such as magnetic cassettes, digital versatile disks (DVDs), Bernoulli cartridges, and the like. These and other variations are intended to be within the scope of the present invention.

Figure 2:
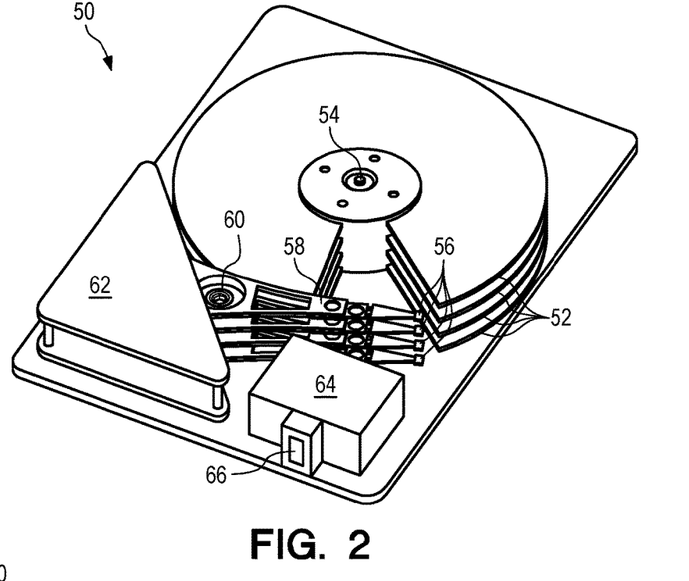
FIG. 2 is a perspective view of a hard disk drive.

FIG. 2 is a perspective view of a hard disk drive 50. The hard disk drive 50 includes one or more disks or platters 52 secured to a central spindle and motor assembly 54. One or more drive heads 56 are secured to a pivot arm 58 extending adjacent the disks 52 from a pivot 60. The position of the arms 58 and, therefore, the position of the drive heads 56 is controlled by a voice coil and magnet assembly 62. The operation of the central spindle and motor assembly 54 and the voice coil and magnet assembly 62 are controlled by a drive controller 64, which may include a data buffer. A connector 66 is provided for connecting the hard disk drive 50 to the system bus of the computer 10 in FIG. 1. Data may be transferred from the computer to be written by one of the drive heads 56 at a particular location on one of the disks 52, or data may be read by one of the drive heads 56 at a particular location on one of the disks 52 and transferred to the computer. It should be understood that each disk 52 is a complete disk, but has been illustrated with sections removed in order to show the drive heads 56.

Figure 3:
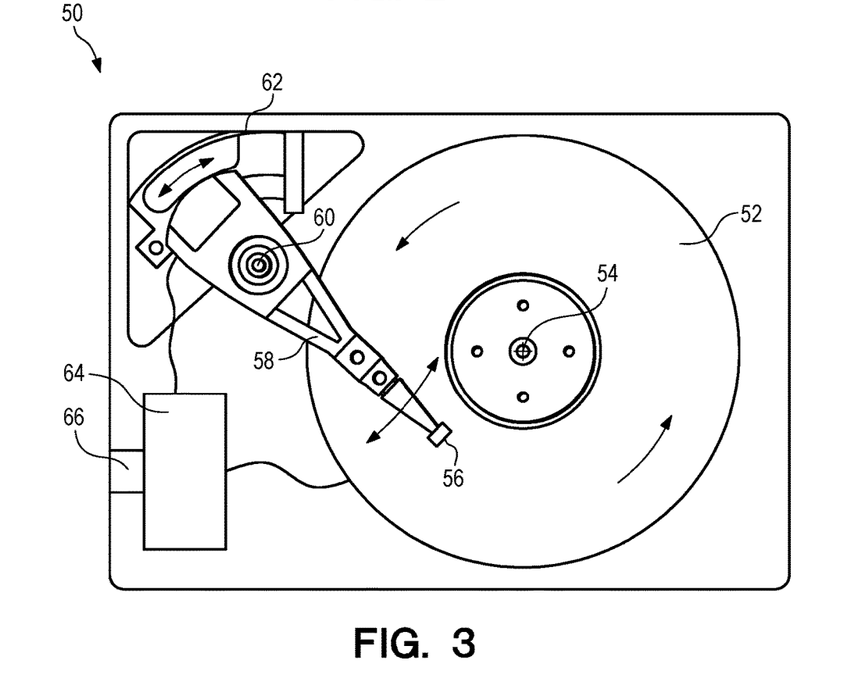
FIG. 3 is a top view of a hard disk drive.

FIG. 3 is a top view of a hard disk drive 50, where the components are labeled with the same reference numbers as in FIG. 2. The drive controller 64 receive read or write commands from a computer through the connector 66, and executes those command by controlling the voice coil and magnet assembly 62 to position the drive head 56 at a desired track of the disk 52. While the drive controller 64 also controls the central spindle and motor assembly 54, the rotation or spinning imparted to the disk 52 is typically at a constant rotational speed in a single direction. The drive controller 64 will further control any internal data buffer and the transfer of data to or from the drive head 56. In order to read or write data relative to a given track of the disk 52, the drive head is laterally positioned in alignment with the desired track and the spindle causes the disk 52 to rotate the desired sector under the drive head 56.

Figure 4:
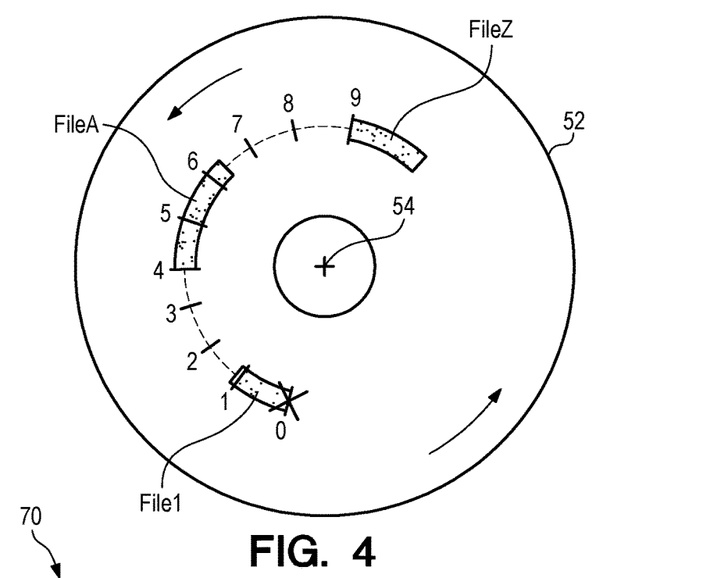
FIG. 4 is a schematic diagram of a hard disk storing an identified sequence of three files in accordance with a first embodiment of the invention.

FIG. 4 is a schematic diagram of a hard disk 52 storing an identified sequence of three files in accordance with a first embodiment of the invention. The three files include a first file (File1), a second file (FileA) and a third file (FileZ). In accordance with embodiments of the present invention, access to files that are stored on the disk 52 have been tracked, and a file access sequence has been identified as involving the first file (File1) and the second file (FileA) stored on the disk, wherein the first file (File1) is accessed before the second file (FileA). In fact, this illustration includes a third file (FileZ) that is accessed after the second file (FileA). Furthermore, the data obtain by tracking access to files on the disk allows a determination of a time differential (T=4) between a time that the first file is accessed and a time that the second file is accessed. Similarly, it is possible to determine a time differential (T=9) between a time that the first file is accessed and a time that the third file is accessed. Alternatively, the time differential (T=5) could be determined between the time that the second and third files are accessed. Knowing the rotational direction and speed of the disk 52, the speed at which a drive head 56 can move between tracks, and the time differentials between the files in the identified file sequence, one or more of the three files have been migrated to the locations shown on the disk 52. The locations shown are determined, in accordance with embodiments of the present invention, so that, after the drive head of the disk has read the first file, the drive head can be repositioned at a beginning of the second file in a period of time that is a function of the time differential.

In the example shown in FIG. 4, the file sequence FileA-File1-FileZ has been identified because the file access data supports a finding that FileA is accessed after File1 90% of the time, followed by FileZ 80% of the time. This might be a case where File1 is an Excel.exe file, FileA is an Excel.dll file and FileZ is a Parts.xls file. Accordingly, the files can be accessed quicker by migrating or relocating one or more of the files to a new location, so that the files are stored in relative locations as a function of the identified time differentials (temporal relationships).

Where File1 is accessed at time T=0, FileA is accessed at time T=4 and FileZ is accessed at time T=9, the files are stored in the locations shown. The diagram illustrates the position of the drive head with a large "X" and includes markings 0-9 illustrating the location of the disk that will rotate under the drive head during successive time units (possibly microseconds). Accordingly, the three files can be read in sequence and each subsequent file will rotate under the drive head at the appropriate time to be promptly accessed. If the files were spaced further apart, it would take longer to access the files in sequence. Furthermore, even if the files were spaced closer together (i.e., back to back, for example), then it would still take longer to access the files since disk would need to complete an additional rotation to read the subsequent file following a request to access the subsequent file.

Figure 5:
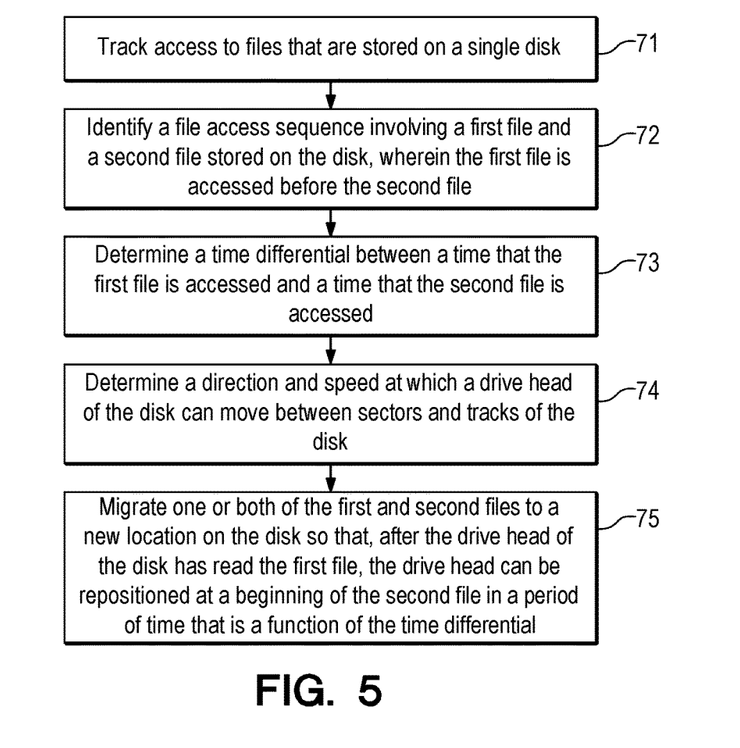
FIG. 5 is a flowchart of a method in accordance with the first embodiment of the invention.

FIG. 5 is a flowchart of a method 70 in accordance with the first embodiment of the invention. The method includes (step 71) tracking access to files that are stored on a single disk; (step 72) identifying a file access sequence involving a first file and a second file stored on the disk, wherein the first file is accessed before the second file; (step 73) determining a time differential between a time that the first file is accessed and a time that the second file is accessed; (step 74) determining a direction and speed at which a drive head of the disk can move between sectors and tracks of the disk; and (step 75) migrating one or both of the first and second files to a new location on the disk so that, after the drive head of the disk has read the first file, the drive head can be repositioned at a beginning of the second file in a period of time that is a function of the time differential.

Figure 6:
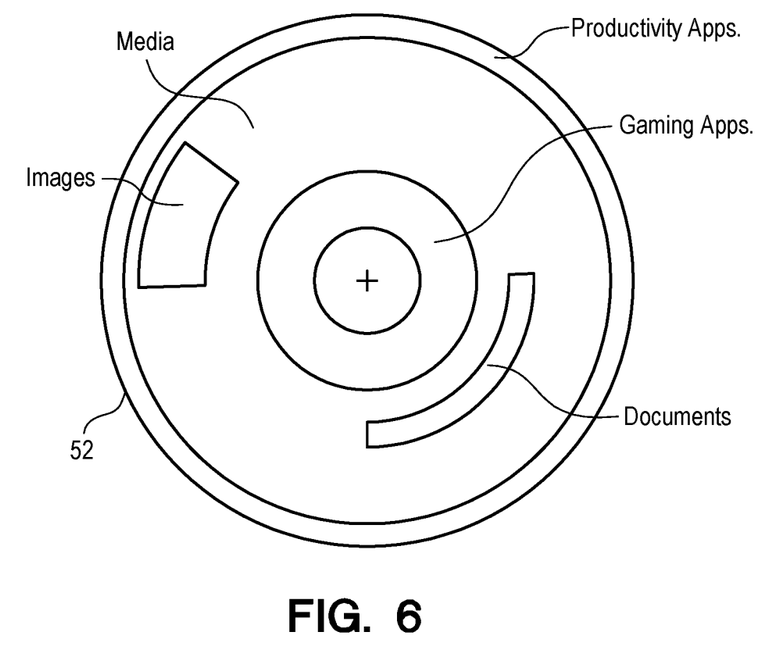
FIG. 6 is a schematic diagram of a hard disk having areas of the disk allocated to certain file types in accordance with a second embodiment of the invention.

FIG. 6 is a schematic diagram of a hard disk 52 having areas of the disk allocated to certain file types in accordance with a second embodiment of the invention. In this example, the disk includes regions allocated to images, media, productivity apps, gaming apps, and documents. The size and placement of each region is determined on the basis of a disk drive usage history associated with a particular user.

Figure 7:
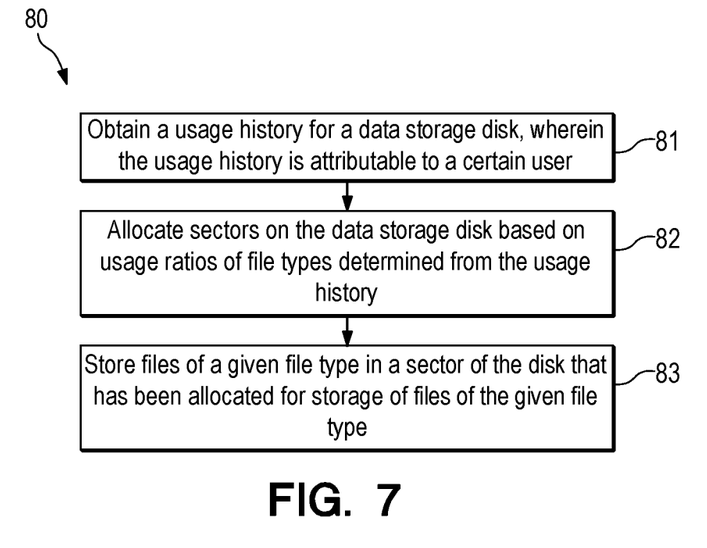
FIG. 7 is a flowchart of a method in accordance with the second embodiment of the invention.

FIG. 7 is a flowchart of a method 80 in accordance with the second embodiment of the invention. The method includes (step 81) obtaining a usage history for a disk drive, wherein the usage history is attributable to a certain user; (step 82) allocating regions on the disk drive based on usage ratios of file types determined from the usage history; and (step 83) storing files of a given file type in a region of the disk that has been allocated for storage of files of the given file type.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    tracking access to files that are stored on a single disk, wherein tracking access to files that are stored on a single disk includes preparing a log including a plurality of file access entries, wherein each file access entry identifies a file name and a time that the named file was accessed;
    identifying a file access sequence involving a first file and a second file stored on the disk, wherein the first file is accessed before the second file;
    determining a time differential between a time that the first file is accessed and a time that the second file is accessed, wherein the time differential is based on file access entries stored in the log and associated with the first file and the second file;
    determining a direction and speed at which a drive head of the disk can move between sectors and tracks of the disk; and
    migrating one or both of the first and second files to a new location on the disk so that, after the drive head of the disk has read the first file at a first sector and track, the drive head can be repositioned at a beginning of the second file at a second sector and track in a period of time that is a function of the time differential, and wherein the first and second files are not in contiguous locations on the disk after migrating one or both of the first and second files.

2. The method of claim 1, wherein identifying a file access sequence involving a first file and a second file stored on the disk includes determining whether the first file and the second file are accessed in the same sequence in greater than a predetermined percentage of accesses to either the first or second file.

3. The method of claim 1, wherein determining a time differential between a time that the first file is accessed and a time that the second file is accessed includes determining an average time differential over a plurality of instances of the file access sequence.

4. The method of claim 1, wherein determining a time differential between a time that the first file is accessed and a time that the second file is accessed includes determining the greatest time differential among a plurality of instances of the file access sequence.

5. The method of claim 1, wherein determining a direction and speed at which a drive head of the disk can move between sectors and tracks of the disk includes measuring the speed at which the drive head moves between files.

6. The method of claim 1, further comprising:
    mapping drive head speed between sectors or tracks on the disk.

7. The method of claim 5, wherein the disk head speed is mapped by disk firmware or drivers.

8. The method of claim 5, wherein the operating system obtains disk head speed data from the disk and determines the new location for one or both of the first and second files.

9. The method of claim 1, wherein one or both of the first and second files are migrated during a period that the disk is not being used.

10. The method of claim 1, further comprising:
    periodically defragmenting files stored on the disk, wherein one or both of the first and second files are migrated during the defragmenting of the files stored on the disk.

11. The method of claim 1, wherein the period of time is equal to the time differential plus no more than 25 percent of the time differential.

12. The method of claim 1, wherein the period of time is equal to the time differential plus no more than 25 percent of a time required for one rotation of the disk.

13. The method of claim 1, wherein migrating one or both of the first and second files to a new location on the disk includes migrating only the smallest file among the first and second files.

14. A computer program product comprising a non-transitory computer readable storage medium having program instructions embodied therewith, the program instructions executable by a processor to:
    track access to files that are stored on a single disk, wherein tracking access to files that are stored on a single disk includes preparing a log including a plurality of file access entries, wherein each file access entry identifies a file name and a time that the named file was accessed;

identify a file access sequence involving a first file and a second file stored on the disk, wherein the first file is accessed before the second file;

determine a time differential between a time that the first file is accessed and a time that the second file is accessed, wherein the time differential is based on file access entries stored in the log and associated with the first file and the second file;

determine a direction and speed at which a drive head of the disk can move between sectors and tracks of the disk; and migrate one or both of the first and second files to a new location on the disk so that, after the drive head of the disk has read the first file at a first sector and track, the drive head can be repositioned at a beginning of the second file at a second sector and track in a period of time that is a function of the time differential, and wherein the first and second files are not in contiguous locations on the disk after migrating one or both of the first and second files.

* * * * *